(12) United States Patent
Zareba et al.

(10) Patent No.: US 12,014,611 B1
(45) Date of Patent: Jun. 18, 2024

(54) TEMPORAL MOTION ZONES FOR AUDIO/VIDEO RECORDING DEVICES

(71) Applicant: Amazon Technologies, Inc., Seattle, WA (US)

(72) Inventors: Roman Bogdan Zareba, Playa Del Rey, CA (US); John Modestine, Los Angeles, CA (US); Todd M. Pearson, Antioch, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/455,136

(22) Filed: Jun. 27, 2019

Related U.S. Application Data

(60) Provisional application No. 62/703,249, filed on Jul. 25, 2018.

(51) Int. Cl.
G08B 13/196 (2006.01)
H04N 7/18 (2006.01)
H04N 23/62 (2023.01)

(52) U.S. Cl.
CPC ....... *G08B 13/19602* (2013.01); *H04N 7/183* (2013.01); *H04N 7/188* (2013.01); *H04N 23/62* (2023.01)

(58) Field of Classification Search
CPC ......... G08B 13/19602; H04N 5/23216; H04N 7/183; H04N 7/188
See application file for complete search history.

(56) References Cited

U.S. PATENT DOCUMENTS

| | | |
|---|---|---|
| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |

(Continued)

*Primary Examiner* — Sunghyoun Park
(74) *Attorney, Agent, or Firm* — Lee & Hayes, P.C.

(57) ABSTRACT

The A/V recording and communication devices used in a security system may be configured to detect motion, and to track and report that motion to a building resident. Some residents may wish to customize the tracking and reporting of motion based upon where and when the motion is detected. For example, a user may wish to be alerted when cars drive down her residential street at night, but does not wish to be alerted when cars drive down the street during the day. The present embodiments disclose several tools and methods by which a building resident can configure and manage the tracking and reporting of detected motion. To do so, the resident should configure two or more motion zones within the field of view captured by a camera, together with a set of time windows during which she wishes to track or be notified of detected motion.

28 Claims, 11 Drawing Sheets

(56) References Cited

U.S. PATENT DOCUMENTS

| | | | | |
|---|---|---|---|---|
| 9,060,103 | B2 | 6/2015 | Scalisi | |
| 9,060,104 | B2 | 6/2015 | Scalisi | |
| 9,065,987 | B2 | 6/2015 | Kasmir et al. | |
| 9,082,018 | B1 * | 7/2015 | Laska | G06F 3/04845 |
| 9,094,584 | B2 | 7/2015 | Scalisi et al. | |
| 9,113,051 | B1 | 8/2015 | Scalisi | |
| 9,113,052 | B1 | 8/2015 | Scalisi et al. | |
| 9,118,819 | B1 | 8/2015 | Scalisi et al. | |
| 9,142,214 | B2 | 9/2015 | Scalisi | |
| 9,160,987 | B1 | 10/2015 | Kasmir et al. | |
| 9,165,444 | B2 | 10/2015 | Scalisi | |
| 9,172,920 | B1 | 10/2015 | Kasmir et al. | |
| 9,172,921 | B1 | 10/2015 | Scalisi et al. | |
| 9,172,922 | B1 | 10/2015 | Kasmir et al. | |
| 9,179,107 | B1 | 11/2015 | Scalisi et al. | |
| 9,179,108 | B1 | 11/2015 | Scalisi et al. | |
| 9,179,109 | B1 | 11/2015 | Kasmir et al. | |
| 9,196,133 | B2 | 11/2015 | Scalisi et al. | |
| 9,197,867 | B1 | 11/2015 | Scalisi et al. | |
| 9,230,424 | B1 | 1/2016 | Scalisi et al. | |
| 9,237,318 | B2 | 1/2016 | Kasmir et al. | |
| 9,247,219 | B2 | 1/2016 | Kasmir et al. | |
| 9,253,455 | B1 | 2/2016 | Harrison et al. | |
| 9,342,936 | B2 | 5/2016 | Scalisi | |
| 9,508,239 | B1 | 11/2016 | Harrison et al. | |
| 9,736,284 | B2 | 8/2017 | Scalisi et al. | |
| 9,743,049 | B2 | 8/2017 | Scalisi et al. | |
| 9,769,435 | B2 | 9/2017 | Scalisi et al. | |
| 9,786,133 | B2 | 10/2017 | Harrison et al. | |
| 9,799,183 | B2 | 10/2017 | Harrison et al. | |
| 2003/0025599 | A1 * | 2/2003 | Monroe | G08B 13/19684 340/531 |
| 2014/0160294 | A1 * | 6/2014 | Naylor | G08B 13/19606 348/155 |
| 2015/0027178 | A1 * | 1/2015 | Scalisi | H04N 7/188 70/277 |
| 2015/0228167 | A1 * | 8/2015 | Scalisi | G08B 13/19695 340/326 |
| 2017/0085843 | A1 * | 3/2017 | Scalisi | G08B 13/1966 |
| 2017/0163944 | A1 * | 6/2017 | Jeong | H04N 7/188 |
| 2017/0300751 | A1 * | 10/2017 | Teichman | G06K 9/00295 |
| 2018/0176512 | A1 * | 6/2018 | Siminoff | G08B 13/19602 |
| 2019/0141919 | A1 * | 5/2019 | Kundra | G06K 9/00765 348/159 |
| 2019/0313024 | A1 * | 10/2019 | Selinger | H04N 5/23241 |

\* cited by examiner

TEMPORAL MOTION ZONES FOR AUDIO/VIDEO RECORDING DEVICES

CROSS-REFERENCE TO RELATED APPLICATION

This application claims priority to provisional application Ser. No. 62/703,249, filed on Jul. 25, 2018, the entire contents of which are hereby incorporated by reference.

TECHNICAL FIELD

The present embodiments relate to audio/video (A/V) recording and communication devices, including A/V recording and communication doorbells, security cameras, and floodlight controllers. In particular, the present embodiments relate to improvements in the capability and functionality of A/V recording and communication devices that strengthen the ability of such devices to reduce crime and enhance public safety, and that provide an improved user experience.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars. In addition, the A/V recording and communication devices can enable a user to monitor the premises when they are absent from the home.

SUMMARY

The various embodiments of the present temporal motion zones for audio/video recording devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

A/V recording and communication devices (such as video doorbells and other security cameras) can be used to learn, capture, and track information about what transpires around a premises (e.g., a house) when no one is home, or when no one is awake. Each security camera captures a specific field of view. Users of such security systems and A/V recording and communication devices may draw, define, and/or configure one or more motion zones within each field of view. For example, when so configured, any motion detected within a motion zone can be recorded and tracked, and the A/V recording and communication device may further be configured to send alert notifications to the user when motion is detected within the motion zone.

Each user may have a different set of circumstances for which he or she wishes to—or does not wish to—track, or be notified of, motion near the home. In one example scenario, a user may live on a residential street that typically experiences a high volume of traffic during the day, but a very low volume of traffic at night. That user may wish to track and/or be notified each time a car drives down the residential street at night, but the same user may not wish to track or be notified every time a car drives down the street during daylight hours. In a different example scenario, a resident may wish to track and/or be notified any time motion is detected in the driveway and/or the walkway of the resident's home. However, in that example scenario, the resident may know that the garbage always gets picked up from the driveway (but not the walkway) between 7:00 AM and 8:00 AM on a given day, and so may not wish to track and/or be notified when motion is detected in the driveway during this time window.

With security systems and A/V recording and communication devices other than the present embodiments, the user in the above scenarios must configure his or her security system to create one or more motion zones, and then manually, and repeatedly, reconfigure those motion zones to activate and deactivate alert notifications at desired times of the day, which is both inconvenient and difficult to remember. The present embodiments solve this problem by enabling a user to create motion zones for the field of view of a given camera, and to configure those motion zones and the system to automatically take certain actions, or to automatically suppress certain actions (e.g., to track activity and/or generate and send notifications), depending upon the time of day when motion is detected.

In a first aspect, an audio/video (A/V) recording and communication device comprises a camera having a field of view (FOV), one or more processors, and a non-transitory machine-readable memory storing a program, the program executable by at least one of the one or more processors, where the program comprises instructions for (i) monitoring for the detection of motion during a first time window and a second time window that is different from the first time window; (ii) detecting, using the camera, a first motion within a first zone of the FOV during the first time window; (iii) in response to the detection of the first motion, executing a motion detection protocol; (iv) detecting, using the camera, a second motion within a second zone of the FOV during the first time window; (v) in response to the detection of the second motion, suppressing the motion detection protocol; (vi) detecting, using the camera, a third motion within the second zone of the FOV during the second time window; and (vii) in response to the detection of the third motion, executing the motion detection protocol.

In an embodiment of the first aspect, the A/V recording and communication device further comprises one or more sensors. In another embodiment of the first aspect, the one or more sensors comprise a motion detection sensor for detecting motion within the FOV of the camera. In a third embodiment of the first aspect, the program further comprises instructions for causing the camera to transition from an inactive state to an active state in response to the motion detection sensor detecting motion within the FOV of the camera. In a different embodiment of the first aspect, detecting the first motion within the first zone of the FOV during the first time window comprises detecting, using at least one of the camera and the one or more sensors, the first motion within the first zone of the FOV during the first time window. In yet another embodiment of the first aspect, detecting the second motion within the second zone of the FOV during the first time window comprises detecting, using at least one of the camera and the one or more sensors, the second motion within the second zone of the FOV during the first time window.

In another embodiment of the first aspect, the A/V recording and communication device further comprises a communication module. In one embodiment, the motion detection protocol comprises generating a motion alert and transmitting the motion alert via the communication module to a computing device. In another embodiment, the motion detection protocol comprises transmitting video data from the camera associated with the detected motion to a computing device.

In a different embodiment, the first time window begins at about sunrise, and the second time window begins at about sunset. In one embodiment, the A/V recording and communication device further comprises a communication module, and the communication module is configured to download sunrise and sunset data for one or more days. In another embodiment, the communication module is configured to communicate with a backend server and receive from the backend server an instruction to transition between a first state associated with the first time window and a second state associated with the second time window. In yet another embodiment, the communication module is configured to communicate with a hub device, and wherein the hub device is configured to issue an instruction to the A/V recording and communication device to transition between a first state associated with the first time window and a second state associated with the second time window.

In a different embodiment of the first aspect, the A/V recording and communication device further comprises one or more light sensors configured to detect a light intensity level, and wherein the program further comprises instructions for determining when a time of day is approaching sunrise and sunset based on the light intensity level detected by the one or more light sensors. In another embodiment of the first aspect, the A/V recording and communication device further comprises a communication module configured to communicate with one or more other A/V recording and communication devices capable of recording audio and video within at least one of the first and second zones, wherein the processor is configured to execute the motion detection protocol by causing the other A/V recording and communication devices to begin recording audio and video.

In yet another embodiment of the first aspect, the A/V recording and communication device further comprises a light source associated with, and capable of illuminating at least a portion of, the first zone and the second zone. In a different embodiment of the first aspect, the program further comprises instructions for receiving an input indicating a set of boundaries defining the first zone and the second zone. In another embodiment, the program further comprises instructions for receiving an input indicating a set of times defining respective beginnings of the first time window and the second time window.

In another embodiment of the first aspect, the program further comprises instructions for detecting, using the camera, a fourth motion within the first zone of the FOV during the second time window; and in response to the detection of the fourth motion, executing the motion detection protocol. In a different embodiment of the first aspect, the program further comprises instructions for detecting, using the camera, a fourth motion within the first zone of the FOV during the second time window; and in response to the detection of the fourth motion, suppressing the motion detection protocol.

In a second aspect, an audio/video (A/V) recording and communication device comprises a camera having a field of view (FOV), one or more sensors, one or more processors, and a non-transitory machine-readable memory storing a program, the program executable by at least one of the one or more processors, where the program comprises instructions for (i) determining whether a current time of day is associated with a first time window or a second time window that is different from the first time window based on the detected light intensity level; (ii) detecting, using at least one of the camera and the one or more sensors, a first motion within a first zone of the FOV during the first time window; (iii) in response to the detection of the first motion, suppressing a motion notification for the first motion; (iv) detecting, using at least one of the camera and the one or more sensors, a second motion within a second zone of the FOV during the first time window; (v) in response to the detection of the second motion, transmitting a motion notification; (vi) detecting, using at least one of the camera and the one or more sensors, a third motion within the first zone of the FOV during the second time window; and (vii) in response to the detection of the third motion, transmitting a motion notification.

In another embodiment of the second aspect, the A/V recording and communication device further comprises a communication module. In one embodiment, transmitting the motion notification comprises generating the motion notification and transmitting the motion notification via the communication module to a computing device. In another embodiment of the second aspect, transmitting the motion notification comprises transmitting video data from the camera associated with the detected motion to a computing device.

In a different embodiment of the second aspect, the communication module is configured to download sunrise and sunset data for one or more days. In one embodiment, the first time window begins at about sunrise and the second time window begins at about sunset. In a different embodiment, the A/V recording and communication device further comprises a light source associated with, and capable of illuminating at least a portion of, the first zone and the second zone.

In yet another embodiment of the second aspect, the program further comprises instructions for receiving an input indicating a set of boundaries defining the first zone and the second zone. In another embodiment, the program further comprises instructions for receiving an input indicating a set of times defining respective beginnings of the first time window and the second time window. In one alternative embodiment, the program further comprises instructions for detecting, using at least one of the camera and the one or more sensors, a fourth motion within the second zone of the FOV during the second time window; and in response to the detection of the fourth motion, transmitting a motion notification. In a second alternative embodiment, the program further comprises instructions for detecting, using at least one of the camera and the one or more sensors, a fourth motion within the second zone of the FOV during the second time window; and in response to the detection of the fourth motion, suppressing a motion notification for the fourth motion.

In a third aspect, a method for defining temporal motion zones for the selective transmission and suppression of a motion notification by an audio/video (A/V) recording and communication device having a camera is provided, the method comprising: (i) presenting, on a display of a client device, a graphical user interface (GUI) comprising an image of a field of view (FOV) associated with the camera; (ii) receiving, via the GUI, a first set of inputs that define a first boundary of a first zone; (iii) receiving, via the GUI, a first timing input identifying a first time window; (iv) receiving, via the GUI, a second set of inputs that define a second boundary of at least a second zone; (v) receiving, via the GUI, a second timing input identifying a second time window that is different from the first time window; and (vi) transmitting the first set of inputs, the second set of inputs, the first timing input, and the second timing input to the A/V recording and communication device for use in the selective transmission and suppression of motion notifications from the A/V recording and communication device to the client device.

In another embodiment of the third aspect, the first timing input and the second timing input each correspond to a time of day. In a different embodiment of the third aspect, the first timing input and the second timing input correspond to sunrise and sunset, respectively.

In one alternative embodiment of the third aspect, the first zone and the second zone overlap. In a second alternative embodiment of the third aspect, the first zone and the second zone do not overlap.

BRIEF DESCRIPTION OF THE DRAWINGS

The various embodiments of the present temporal motion zones for audio/video recording devices now will be discussed in detail with an emphasis on highlighting the advantageous features. These embodiments depict the novel and non-obvious temporal motion zones for audio/video recording devices shown in the accompanying drawings, which are for illustrative purposes only. These drawings include the following figures, in which like numerals indicate like parts.

DETAILED DESCRIPTION

Figure 1A:
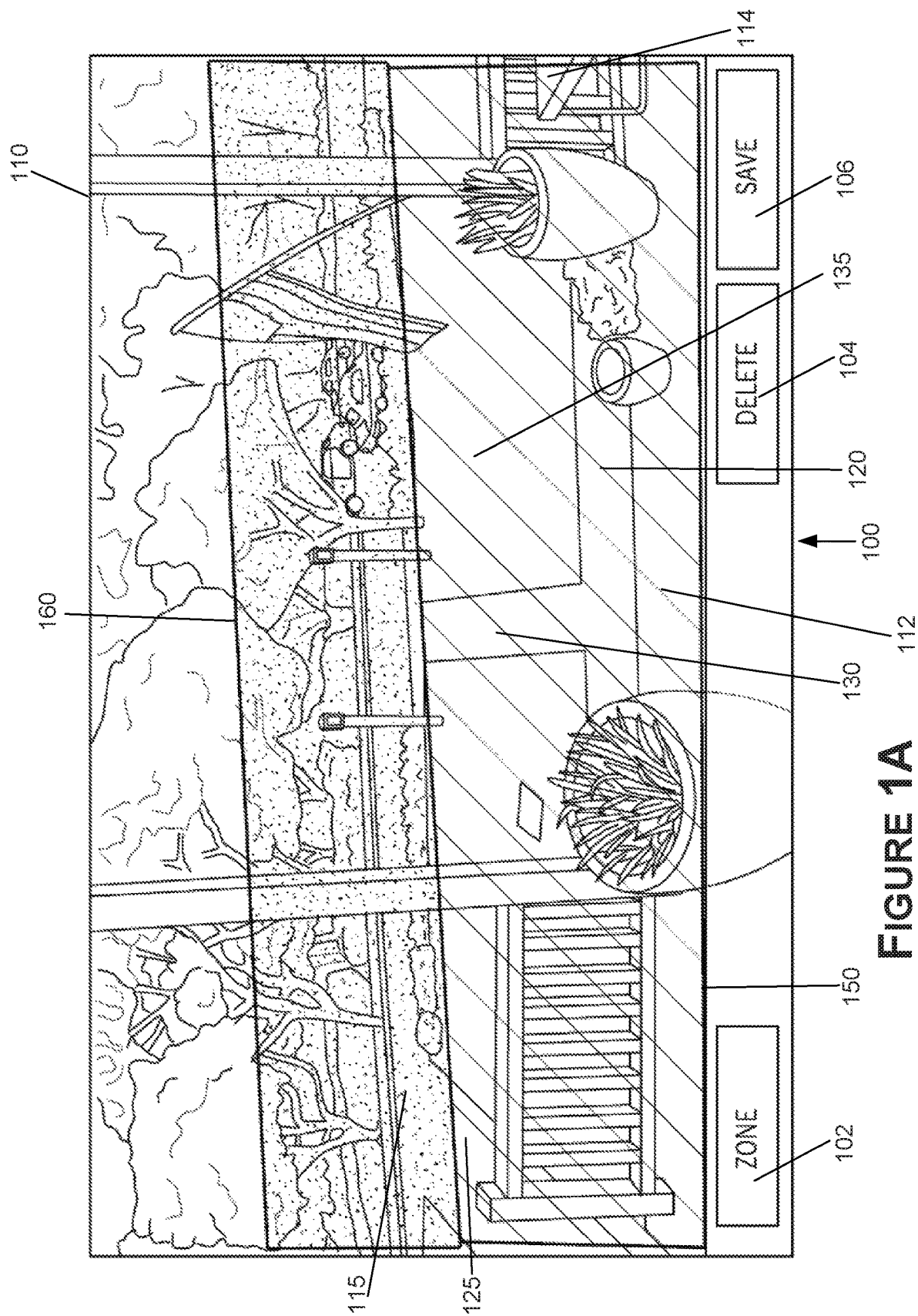
FIGS. 1A-1B are schematic diagrams of an example of a graphical user interface incorporating a field of view of a camera, which can be used to define and/or configure motion zones according to various aspects of the present disclosure.

As explained above, users of security systems and A/V recording and communication devices may define and/or configure one or more motion zones within a field of view of one or more cameras. When so configured, motion detected within a defined motion zone can be recorded and tracked, and the camera device may be further configured to send alert notifications to the user upon detecting motion within the motion zone.

However, each user of a security system and/or A/V recording and communication device may have different preferences regarding when that user wishes to—or does not wish to—track, or be notified of, motion near his or her home or other property. Thus, it would be advantageous to enable users of security systems and of A/V recording and communication devices to define and/or configure for themselves (i) the physical boundaries of motion zones contained within the field of view of one or more cameras associated with their security system; and (ii) the time periods within each day during which the users wish, and do not wish, to have the security system and the cameras monitor and track detected motion, and/or generate and transmit alert notifications regarding detected motion.

Accordingly, in one aspect of the present embodiments, a method for defining temporal motion zones is disclosed. The method may be used to enable the selective execution and suppression of motion detection protocols, and to enable the selective transmission and suppression of motion detection notifications. The method may be executed by an A/V recording and communication device, and may include presenting, on the display of a client device, a graphical user interface that includes an image of a field of view associated with a camera. Through the graphical user interface, the user can enter a set of inputs defining at least one motion zone, and can also enter first and second timing inputs that identify the beginning of first and second time windows, respectively, for at least one such motion zone. The client device may transmit at least some of the inputs to the A/V recording and communication device, for use in selectively transmitting and suppressing motion notifications from the A/V recording and communication device to the client device. The first and second time windows may correspond to different periods of time during which the user wishes, or does not wish, to receive notifications regarding motion detected in the motion zone.

For example, in the scenario discussed above, a user may live on a residential street that often experiences a high volume of automobile traffic during the day, but a very low volume of automobile traffic at night. That user may wish to track and/or be notified each time a car drives down the residential street at night, but the same user may not wish to track or be notified every time a car drives down the street during daylight hours. In that scenario, the user may define a first motion zone that covers his or her driveway and/or walkway, and a second motion zone that covers the street.

The user may also configure settings for at least one of the first and second motion zones so that the first time window begins at about sunrise, and the second time window begins at about sunset. With this configuration, the A/V recording and communication device may execute a motion detection protocol when it detects a first motion within the first motion zone (e.g., the user's driveway) during the first time window (e.g., during daytime), and the A/V device may execute the motion detection protocol when it detects a different motion within the second motion zone (e.g., the street) during the second time window (e.g., during nighttime). However, in a case where the A/V recording and communication device detects yet another motion within the second motion zone (e.g., the street) during the first time window (e.g., during daytime), the device may suppress the motion detection protocol, in order to comply with the user's preference that the security system not track, or at least not notify her of, motion caused by cars driving along the street by the home during the daytime. Here, the motion detection protocol may include the generation and transmission of motion detection alert notifications to a computing device, or it may simply include an instruction to track and log all motions detected within that motion zone during the relevant time period. The protocol could likewise include an instruction to transition a camera from an inactive state to an active state, to enable the monitoring and tracking of such motion.

The remaining detailed description describes the present embodiments with reference to the drawings. In the drawings, reference numbers label elements of the present embodiments. These reference numbers are reproduced below in connection with the discussion of the corresponding drawing features.

Figure 1B:
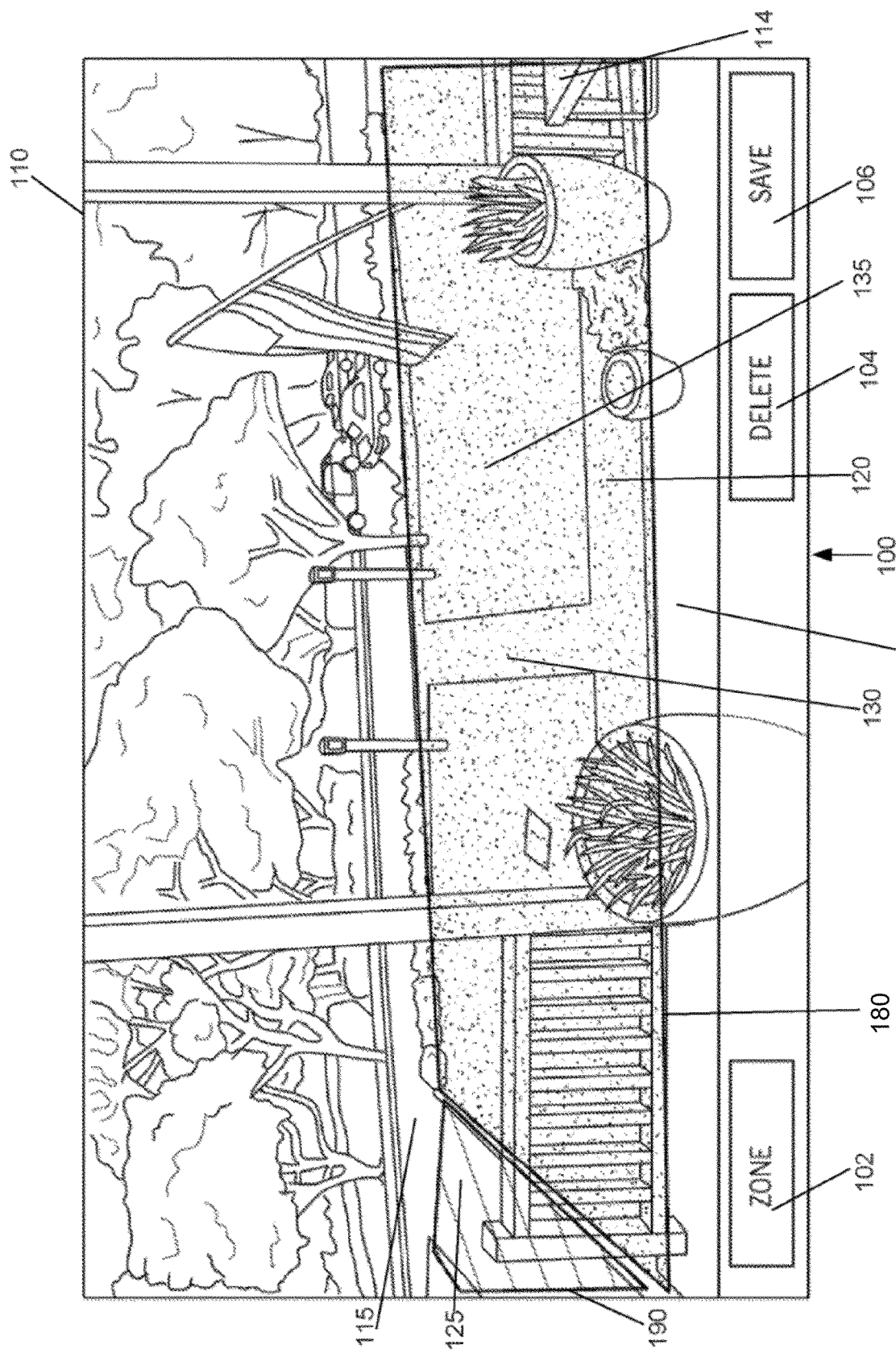

FIGS. 1A-1B are schematic diagrams of a graphical user interface 100 incorporating a field of view 110 of a camera, which graphical user interface 100 can be used to define and/or configure motion zones, according to various aspects of the present disclosure. The graphical user interface 100 may be displayed on the client devices 214, 216, to enable a user of those devices, and of the security system, to configure the temporal motion zones of the present embodiments. As discussed below, the client devices 214, 216 may include a display screen 618 and an input interface 604. The display screen 618 may be configured to display the graphical user interface 100, which includes user input elements 102, 104, 106 and an image reflecting the field of view (FOV) of a camera associated with the security system. In FIGS. 1A-1B, the graphical user interface 100 is displaying the FOV 110 of an example camera positioned near the front door of a home.

The FOV 110 of the example of FIGS. 1A-1B originates from a camera that is positioned near the front door of a home, looking out toward the street 115. The area of the FOV 110 that immediately surrounds the front door of the home is an elevated porch 112; resting on the elevated porch 112 is a chair and some plants. Just beyond the elevated porch 112, there is a walkway 120, which runs parallel to the street 115. The walkway 120 connects a driveway 125 to a walking path 130, which itself connects the elevated porch 112 to the street 115. The walking path 130 is surrounded by the lawn 135. Depending on the user's interests and wishes, the user may wish to capture any or all of the street 115, the walkway 120, the driveway 125, the walking path 130, and the lawn 135 in one or more motion zones, in order to track, and/or receive notifications regarding, motion detected in each of those locations.

In FIG. 1A, the user has created two separate motion zones. The first motion zone 150, identified by the lower, trapezoidal box with cross-hatching, includes the walkway 120, the driveway 125, the walking path 130, and the lawn 135. The second motion zone 160, identified by the ascending box filled with stippling, includes the street 115. These two motion zones 150, 160 are described below with reference to the scenario described above, in which the user wishes to track and/or be notified each time a car drives down the residential street 115 at night, but does not wish to track or be notified every time a car drives down the street 115 during daylight hours. Along with defining the boundaries of the first motion zone 150 and the second motion zone 160, the user may also define a first time window and a second time window, such as by defining the beginning time for each of the first and second time windows.

For example, in the scenario described above, the first time window may commence around sunrise and terminate around sunset, and the second time window may commence around sunset and terminate around sunrise. With the first and second motion zones and the first and second time windows so defined, the A/V recording and communication device may be configured to track, and/or to notify the user about, in one instance, any movements that are detected in the first motion zone 150, regardless of whether they occur during the first time window or the second time window. However, the tracking and/or notifications for any movements detected in the second motion zone 160 may be time window-dependent.

Specifically, since there may be a high volume of automobile traffic on the street 115 during the first time window (e.g., during the daytime), the second motion zone 160 can be programmed such that the A/V recording and communication device 210 suppresses tracking and/or notifications regarding movements detected in the second motion zone 160 during the first time window. However, the second motion zone 160 can likewise be programmed such that the A/V recording and communication device 210 does not suppress tracking or notifications during the second time window (e.g., during the nighttime). Instead, upon the detection of motion within the second motion zone 160 during the second time window, the A/V recording and communication device 210 may execute a motion detection protocol—similar to the motion detection protocol that may be executed relative to the first motion zone during both the first time window and the second time window. In one example, the motion detection protocol may include an instruction to track and log motions detected within the second motion zone during the second time window. In another example, the motion detection protocol may include generating a motion alert and transmitting the motion alert to a computing device (e.g., at least one of the client devices 214, 216). Alternatively, the motion detection protocol may include transmitting video data from the camera device at which motion was detected to a computing device (e.g., at least one of the client devices 214, 216).

FIG. 1B depicts the same graphical user interface 100 illustrated in FIG. 1A including the same FOV 110. However, FIG. 1B includes two motion zones that are distinct from the first motion zone 150 and the second motion zone 160 shown in FIG. 1A. Specifically, FIG. 1B shows a third motion zone 180, identified by the trapezoidal box with stippling on the right-hand side, which includes the walkway 120, the walking path 130, and the lawn 135. A fourth motion zone 190, identified by the left-hand side trapezoidal box filled with cross-hatching, includes the driveway 125. Again, along with defining the boundaries of the third motion zone 180 and the fourth motion zone 190, the user may also define a first time window and a second time window, such as by defining the beginning time and/or the end time for each of the first and second time windows. In this example scenario, the user may not be interested in tracking and/or being notified about any motion detected on the street 115, but may be interested in motion that is detected on the user's property. The user may have defined the third and fourth motion zones 180, 190 in this way because the user's garbage cans (not shown) rest near the end of the driveway 125, and the user knows that the garbage always gets picked up from the driveway 125 between 7:00 AM and 8:30 AM on a given day. Accordingly, the user may define the first time window (when motion notifications and/or a motion detection protocol is/are active) for the fourth motion zone 190 as beginning at 8:30 AM, and the user may define the second time window (when motion notifications and/or a motion detection protocol is/are inactive) for the fourth motion zone 190 as beginning at 7:00 AM. In this way, the user can suppress motion notifications and/or the execution of a motion detection protocol during the 90 minute garbage pickup window.

In some embodiments, two A/V recording and communication devices 210 may have overlapping FOVs. For example, if the camera positioned at the front door of the home depicted in FIGS. 1A-1B was a first A/V recording and communication device 210', a second A/V recording and communication device 210" may be positioned on the garage, at the top of the driveway 125 (not shown in FIGS. 1A-1B). In this scenario, the FOV 110 of the A/V recording and communication device 210' may overlap to some degree with the FOV (not shown) associated with the second A/V recording and communication device 210" positioned on the garage (not shown). In this way, the combined motion zone functionality of the two A/V recording and communication devices 210' and 210" may create additional options for motion detection and notifications.

For example, with two A/V recording and communication devices 210' and 210", the first device 210' can be used to execute and/or suppress motion detection protocols relative to motion detected in the street 115 during the nighttime (to avoid excess notifications during daytime traffic volumes), while the second device 210" can be used to execute and/or suppress motion detection protocols for motion detected in the driveway 125 (to avoid unnecessary notifications when the garbage is picked up). Moreover, as discussed below, each A/V recording and communication device 210 includes a communication module 312 (FIG. 3), which enables communication between the A/V recording and communication device 210 and one or more of a backend server 224, a client device 214, 216, a smart-home hub device 202, and another A/V recording and communication device 210, among other things (such as, e.g., the user's network 218 and/or the network 212). Thus, when two A/V recording and communication devices 210 are used in a security system, and when those two devices have FOVs that overlap, the motion detection protocol executed by one of the A/V recording and communication devices 210 may include issuing an instruction to the other A/V recording and communication device 210 to begin recording audio and video.

Similarly, the motion detection protocol executed by the first A/V recording and communication device 210' may include issuing an instruction to the second A/V recording and communication device 210" to begin monitoring and detecting motion within its own motion zone(s). Thus, the use of additional A/V recording and communication devices 210 can not only expand the potential for creating numerous, overlapping and interworking motion zones, it can also enable the user to rely primarily on a "master" device for detecting motion, where the master device can be used to control and/or activate audio and/or video recording by secondary A/V recording and communication devices. Such functionality enables a more efficient use of the security system resources, because it is not necessary for each and every A/V recording and communication device within a security system to be actively monitoring first and second motion zones at all times. Rather, some such devices may only activate upon the detection of motion in a location covered by two separate FOVs associated with two separate cameras.

Figure 2:
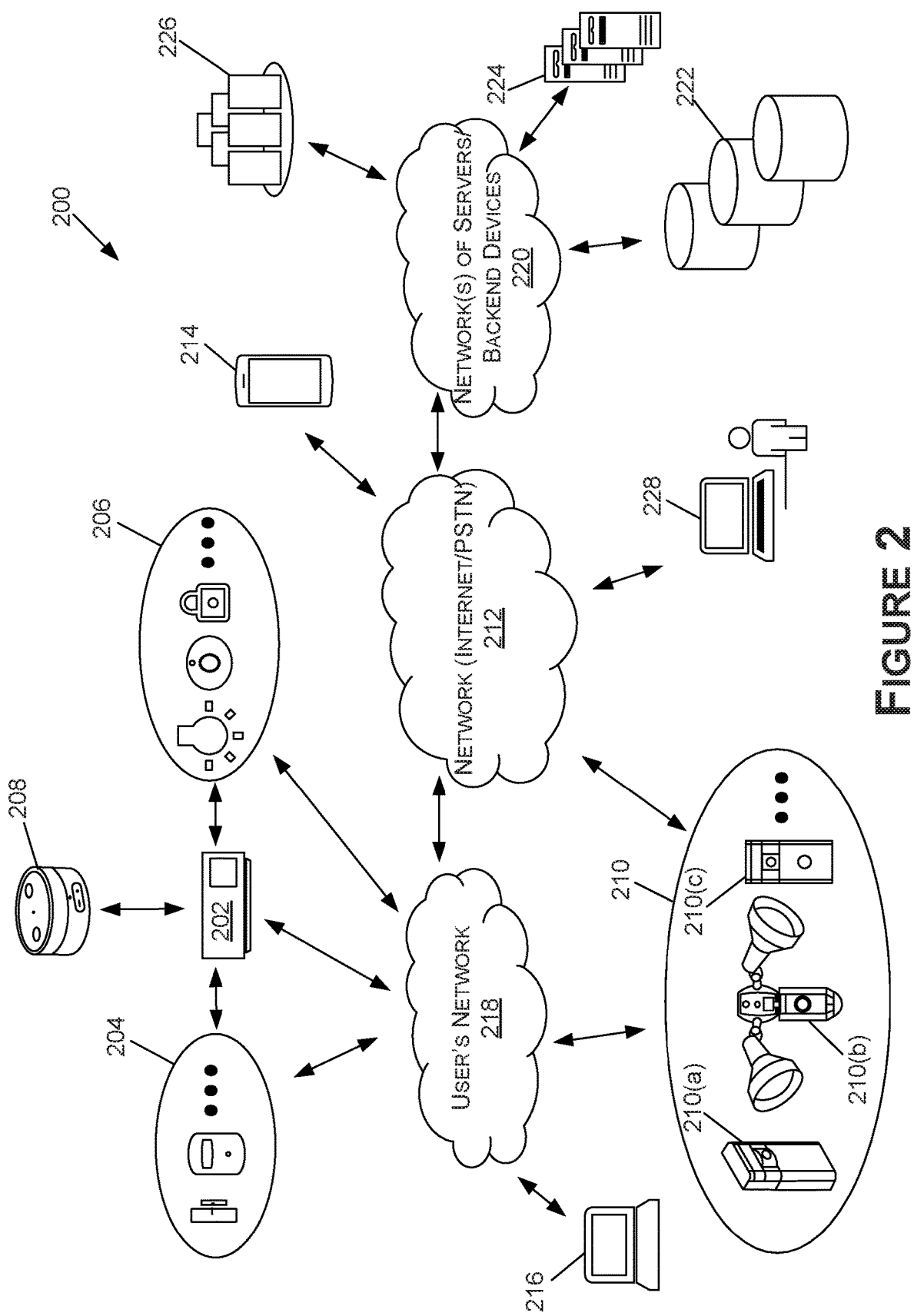
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212 (which may be similar to, and represent the network 212), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, a communication hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively referred to herein as "A/V devices 210" or "A/V device 210") The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a hub device 202 connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/ or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/ blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at a location, such as a property, building, home, business, or premises for the purpose of securing and/or automating all or a portion of the location.

The system 200 may further include one or more client devices 214, 216. The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (which may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices."

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control its own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
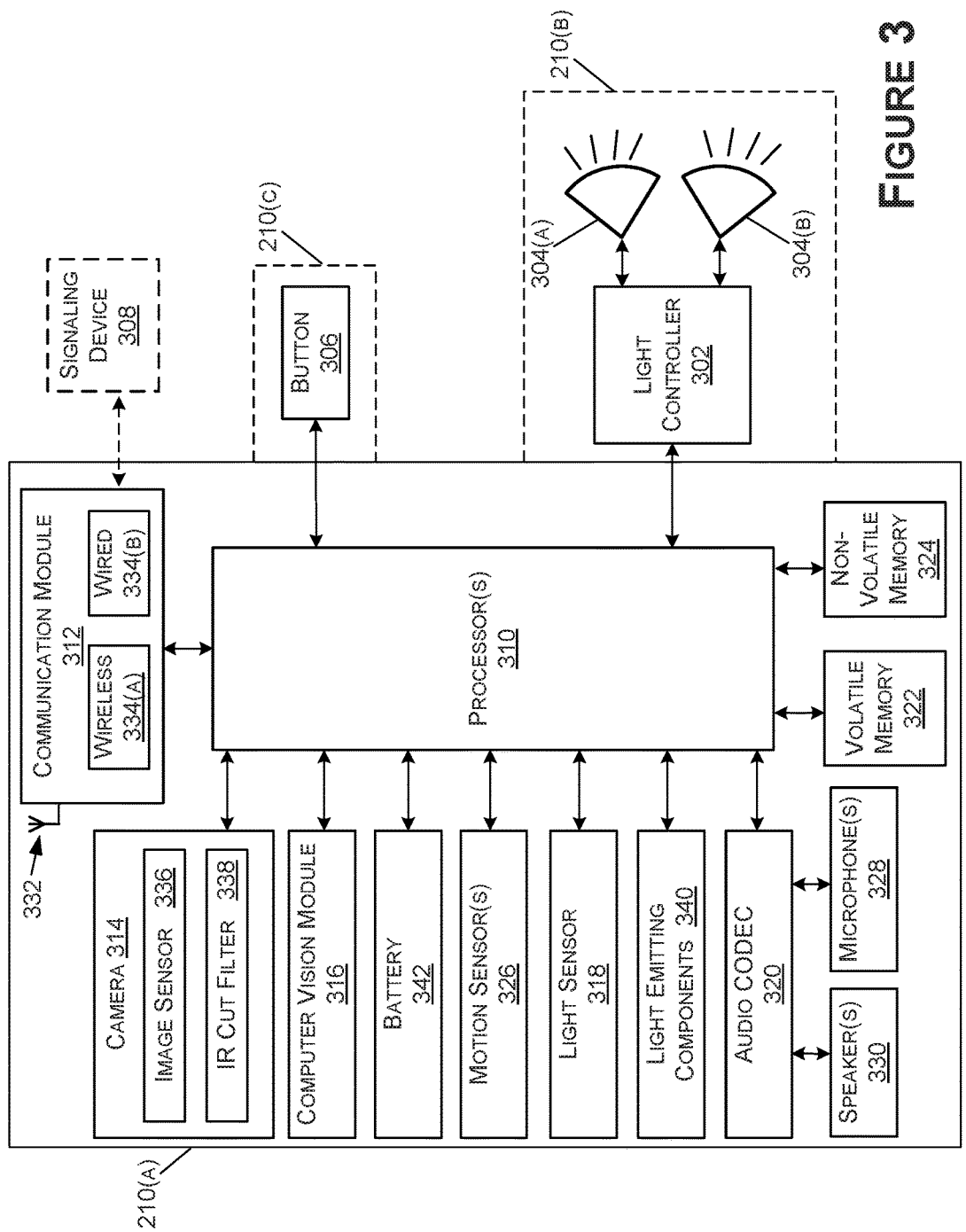
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include one or more processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, including client device 214, 216 and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal may be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The output of the camera 314 may be an image (or series of images, e.g., video) that reflects the field of view (FOV) of the camera 314. Various embodiments may rely upon the FOV of the camera 314, because the temporal motion zones disclosed herein may be defined in physical location parameters that correspond to or can be mapped within the FOV of the camera 314. The camera 314 may include an image sensor 336. The image sensor 336 may include a video recording sensor and/or a camera chip. In one aspect of the present disclosure, the image sensor 336 may comprise a complementary metal-oxide semiconductor (CMOS) array and may be capable of recording high definition (e.g., 720p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SDRAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not to be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively separate from, other motion sensor(s) 326. For example, the CVM 316 may be a low-power CVM (e.g., Qualcomm Glance®) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternatively separate from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to ensure that it satisfies certain assumptions implied by the method. Examples of pre-processing include, but are not limited to re-sampling in order to ensure that the image coordinate system is correct, noise reduction in order to ensure that sensor noise does not introduce false information, contrast enhancement to emsure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and to enable face detection and recognition.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motion sensor(s) 326 and/or the camera 314 detecting motion, the light controller 302 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to begin recording the image data, and the microphone(s) 328 to begin recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more components of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
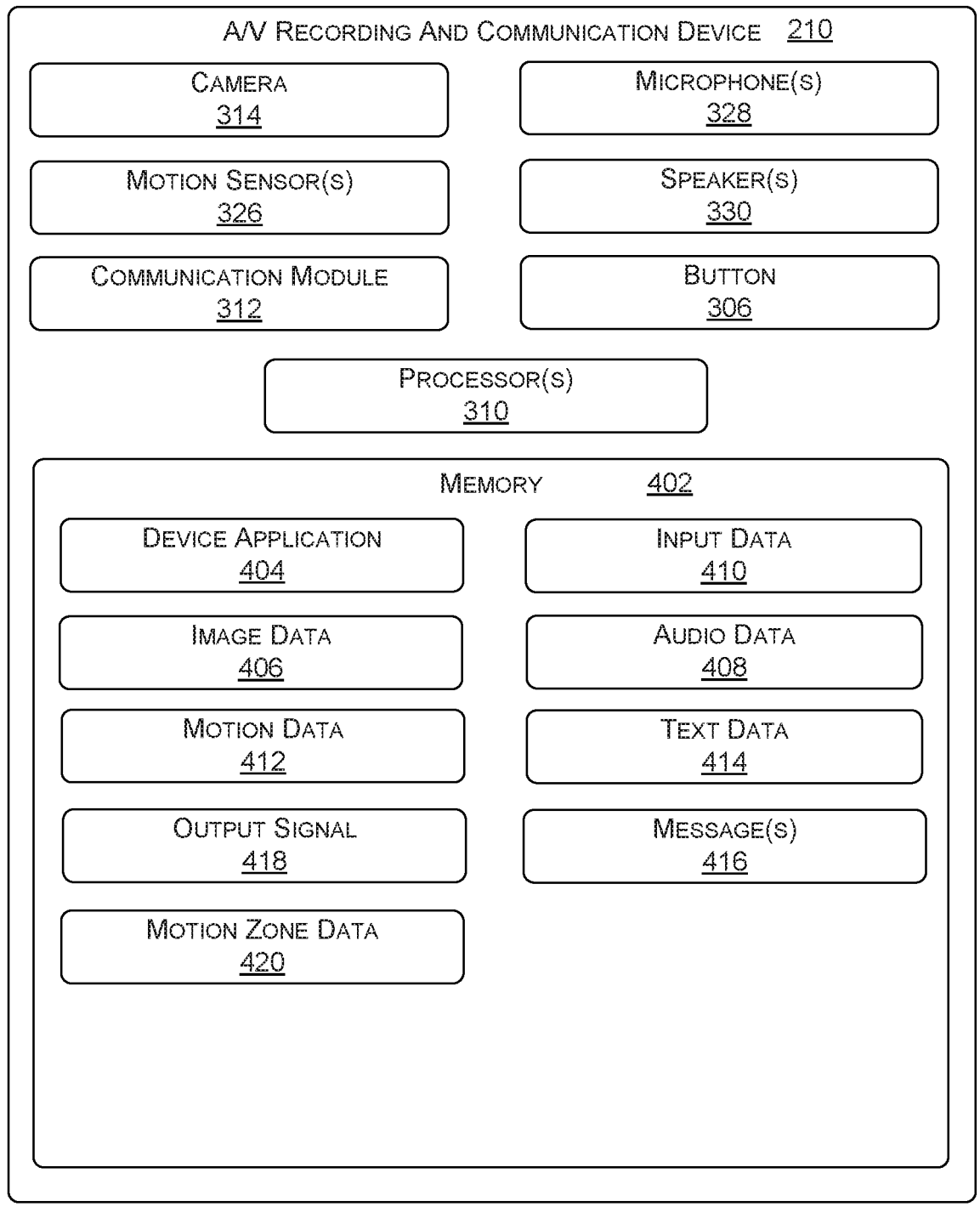
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4. As described herein, at least some of the processes of the backend server 224, the hub device 202, and/or the client device 214, 216 may be executed by the A/V device 210.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia service (MMS) messages, voicemail messages, video signals, audio signals, data transmissions, and/or any other type of electronic communication that an electronic device can send to another electronic device.

The image data 406, the audio data 408, the text data 414, and/or the motion data 412 may be tagged (e.g., with a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

Another type of data that may be stored in the memory 402 of the A/V recording and communication device 210 is motion zone data 420. As described herein, there is a significant amount of information that can be configured and/or tracked using the temporal motion zones of the present embodiments. For example, one or more of the motion zones may be configured to have a set of physical boundaries corresponding to locations within the FOV of the camera 314 associated with the A/V recording and communication device 210. These physical boundaries can be configured for the motion zones as discussed above with reference to FIGS. 1A-1B, and as discussed below with reference to FIG. 10. The motion zone data 420 may thus include the physical boundaries for each motion zone configured by the user.

The motion zone data 420 may also include the timing inputs that define the beginnings and/or endings of the time windows associated with each motion zone. For example, if a first motion zone enters a first time window at 8:00 AM and a second time window at 9:00 PM, then those two times may be stored as part of the motion zone data 420. Further, at least one of the time windows for each motion zone may have a state associated with it in the memory 402 of the A/V recording and communication device 210. For example, in the scenario above, between the beginning of the first time window at 8:00 AM and the beginning of the second time window at 9:00 PM, the first motion zone may be in a first state that defines whether the A/V recording and communication device 210 will execute or suppress a motion detection protocol and/or motion detection notifications. When the time of day approaches 9:00 PM, the A/V recording and communication device 210 transitions from the first state to the second state, which is associated with the second time window. The second state defines whether the A/V recording and communication device 210 will execute or suppress a motion detection protocol and/or motion detection notifications during the second time window. Finally, the motion zone data 420 may also include sunrise and/or sunset times for each day. The sunrise and sunset timing data may be used to define the beginnings of the first and second time windows, respectively.

Figure 5:
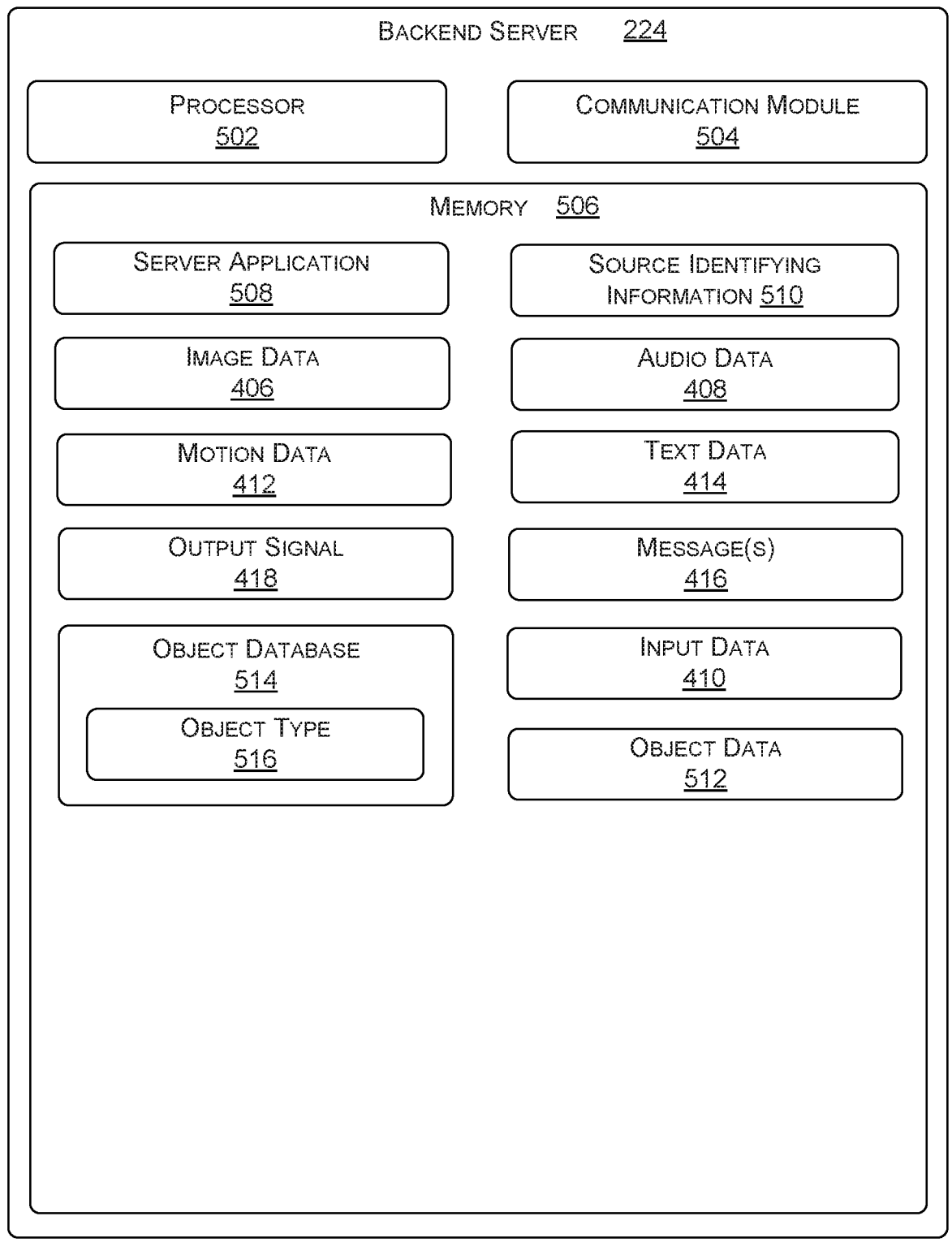
FIG. 5 is a functional block diagram illustrating one example embodiment of a backend device according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, object data 512 generated by the A/V devices 230.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the object data 512.

As described herein, at least some of the processes of the A/V device 210, the hub device 202, and/or the client device 214, 216 may be executed by the backend server 224.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the backend server 224 may analyze the image data 406 whenever the backend server 224 receives the image data 406 from the A/V device 210.

In some examples, to analyze the image data 406, computer vision processing and/or image processing, as described herein, for example, may be performed by the processor(s) 502 of the backend server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparison, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively separate from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the backend server 224, in some embodiments, the image data 406 may be analyzed by any of the A/V recording and communication device 210, the hub device 202, and/or the client device 214, 216 in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 512, as described with reference to FIG. 5.

The hub device 202 and/or the backend server 224 (and/or one or more additional or alternative components of the network(s) of servers/backend devices 220) may alternatively be referred to herein as "network devices."

Figure 6:
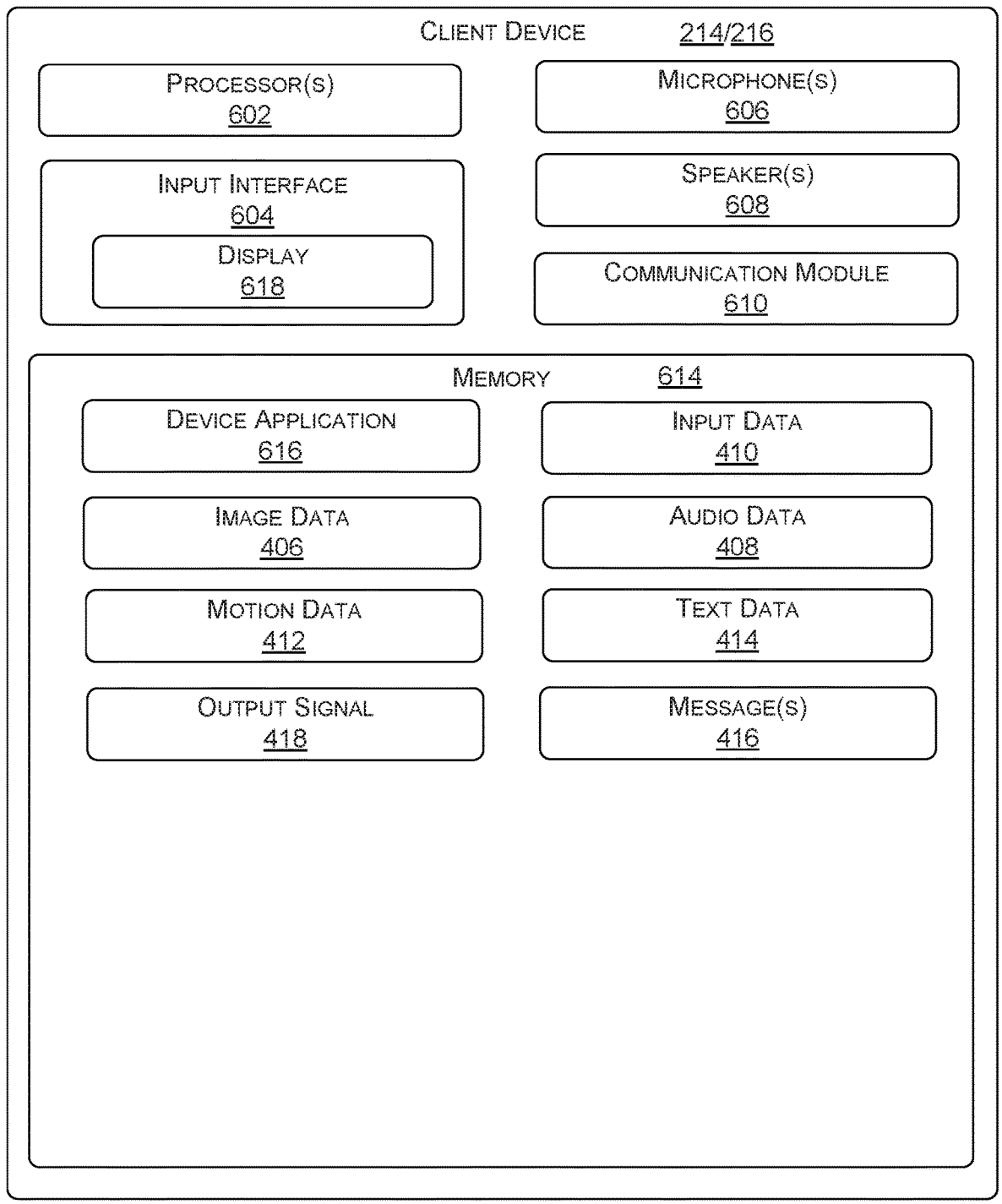
FIG. 6 is a functional block diagram illustrating one example embodiment of a client device according to various aspects of the present disclosure.

FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 614 may store a device application 616. In various embodiments, the device application 616 may configure the processor(s) 602 to receive input(s) to the input interface 604 (e.g., inputs indicating the beginnings and/or endings of the first and second time windows). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618 (e.g., inputs indicating the physical boundaries of a motion zone, which may be drawn over the image shown on the display, which image reflects the FOV of the camera 314 of the A/V recording and communication device 210). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 616 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 616 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216.

Figure 7:
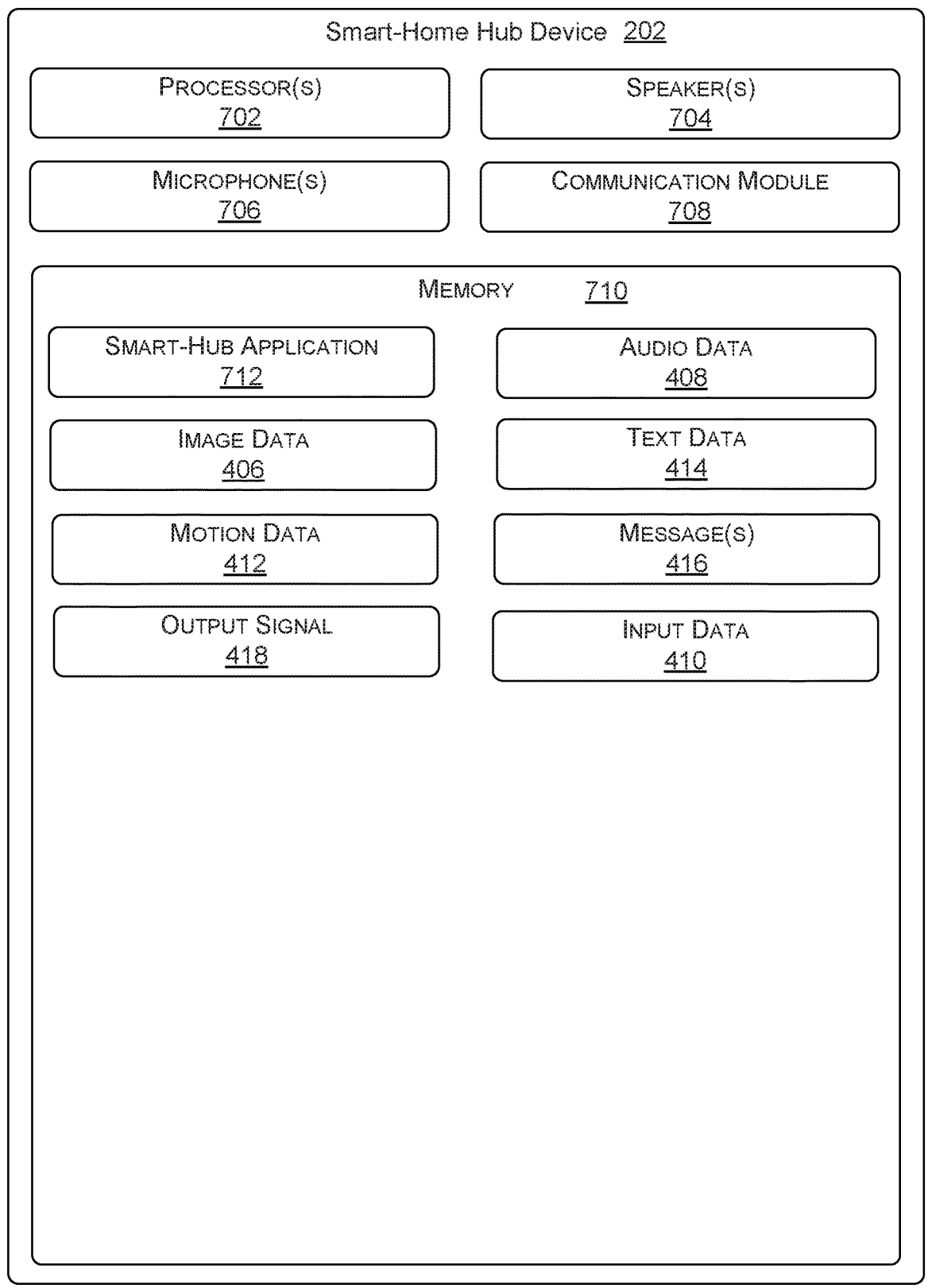
FIG. 7 is a functional block diagram illustrating one example embodiment of a smart-home hub device according to various aspects of the present disclosure.

FIG. 7 is a functional block diagram illustrating an embodiment of the smart-home hub device 202 according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more cameras (not shown). In some embodiments, the hub device 202 may not include one or more of the components shown in FIG. 7, such as the speaker(s) 704 and/or the microphone(s) 706. As described herein, at least some of the processes of the A/V device 210, the backend server 224, and/or the client device 214, 216 may be executed by the hub device 202.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the backend server 224) using the communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the backend server 224 in response to motion being detected by the A/V device 210. The smart-hub application 712 may then configure the processor(s) 702 to transmit, using the communication module 708, the audio data 408, the text data 414, the image data 406, the motion data 412, the input data 410, and/or the messages 416 to the client device 214, 216, the backend server 224, and/or an additional electronic device (e.g., a second A/V device 210, the automation device(s) 206, the sensor(s) 204, etc.).

Each of the processes described herein, including the processes 800, 900, and 1000, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 8:
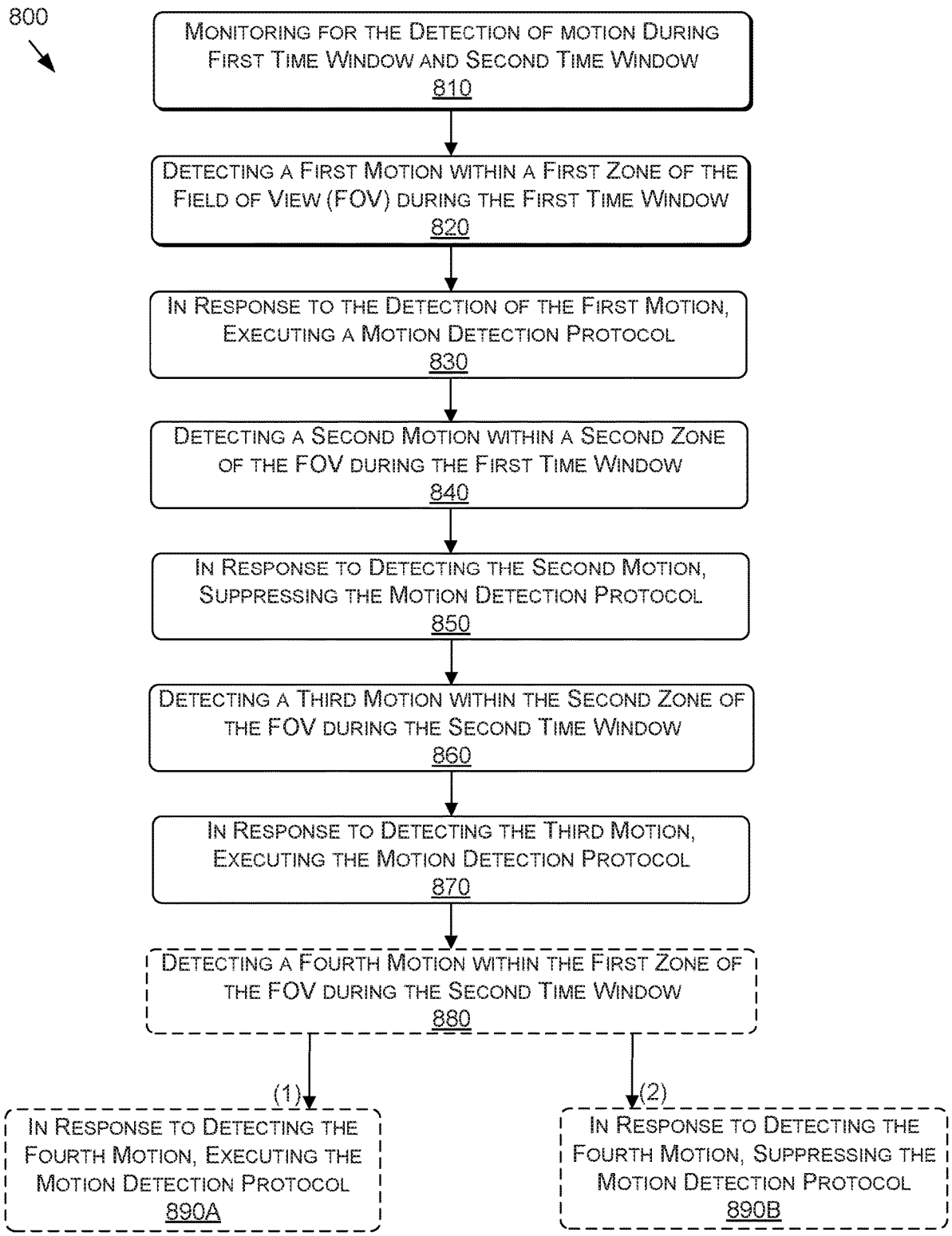
FIG. 8 is a flowchart illustrating an example process for executing and suppressing motion detection protocols based upon the detection of first and second motions in first and second motion zones during different time windows, according to various aspects of the present disclosure.

FIG. 8 is a flowchart illustrating an example process 800 for executing and suppressing motion detection protocols based upon the detection of first and second motions in first and second zones during different time windows. The process 800 may be stored in a non-transitory machine-readable memory, such as the non-volatile memory 324, and may include a computer program executable by at least one processor, including the processor(s) 310. The process 800 begins at block 810, where an A/V recording and communication device 210 is monitoring for the detection of motion during a first time window and a second time window, where the second time window is different from the first time window. At block 820, the A/V recording and communication device 210 detects a first motion within a first zone of the field of view (FOV) of the camera 314 associated with the A/V recording and communication device 210, during the first time window. In various embodiments, the detection of motion may be performed by the camera 314, and/or by any of the sensors that are components of the A/V recording and communication device 210, including the motion sensor(s) 326.

As described above, in response to detecting any motion, including the first motion, the A/V recording and communication device 210 may determine whether that motion took place within any of the motion zones that the user has programmed into the system. If the motion is determined to have taken place within a motion zone, the A/V recording and communication device 210 may also determine whether that specific motion zone is in a first state, in which it is programmed to execute a motion detection protocol, or in a second state, in which it is programmed to suppress a motion detection protocol.

At block 830, in response to detecting the first motion within the first zone during the first time window, the A/V recording and communication device 210 executes a motion detection protocol. As noted above, the motion detection protocol may include the generation and transmission of a motion detection alert notification to a computing device, or it may simply include an instruction to track and log motions detected within that motion zone during the first time window. The protocol could likewise include an instruction to transition a camera, such as the camera 314, from an inactive state to an active state, to enable the monitoring and tracking of such motion. In addition, the motion detection protocol may include transmitting video data from the camera 314 to a computing device (e.g., at least one of the client devices 214, 216). In the example case set forth above, the A/V recording and communication device 210 may execute the motion detection protocol because the first motion was detected within the first motion zone (e.g., the user's driveway) during the first time window (e.g., during daytime), and because the user of the security system wishes to track, and/or be notified about, motion detected in her driveway during the day.

At block 840, the A/V recording and communication device 210 detects a second motion within a second zone of the FOV of the camera 314, also during the first time window. At block 850, in response to the detection of the second motion, the A/V recording and communication device 210 suppresses the motion detection protocol. In the same example case set forth above, the A/V recording and communication device 210 may suppress the motion detection protocol because the second motion was detected within the second motion zone (e.g., the street) during the first time window (e.g., during daytime), and because the user of the security system does not wish to track, or be notified about, motion detected in the street during the day, when there is a larger volume of automobile traffic, and such traffic is less likely to present a potential threat or breach of the security system.

At block 860, the A/V recording and communication device 210 detects a third motion within the second zone of the FOV, this time during the second time window. In response to detecting the third motion, at block 870, the A/V recording and communication device 210 executes the motion detection protocol. Again, using the example set forth above, the A/V/recording and communication device 210 may execute the motion detection protocol because the third motion was detected within the second motion zone (e.g., the street) during the second time window (e.g., during nighttime), and because the user of the security system wishes to track and/or be notified about motion detected in the street at nighttime, when her residential street is typically very quiet.

In some embodiments, the process 800 may continue with the A/V recording and communication device 210 detecting, at block 880, a fourth motion within the first zone of the FOV during the second time window. In response to the fourth motion, the process 800 may alternatively move to either block 890A or block 890B, depending upon the configuration for the first zone of the FOV during the second time window (e.g., whether the motion detection protocol is active or inactive for the first zone of the FOV during the second time window). At block 890A, the A/V recording and communication device 210 executes the motion detection protocol, whereas at block 890B, the A/V recording and communication device 210 suppresses the motion detection protocol.

As explained in more detail above, the A/V recording and communication device 210 may include one or more sensors, including the motion sensor(s) 326 (FIG. 3). The motion sensor(s) 326 may be capable of sensing and detecting motion within the FOV of camera 314. Further, the computer program may additionally include instructions that cause the camera 314, in response to the detection of motion within the FOV of the camera 314 by the motion sensor(s) 326, to transition from an inactive state (e.g., where the camera 314 is not actively recording or monitoring for movement), to an active state (e.g., where the camera 314 is actively recording or monitoring for movement).

As described above in reference to FIGS. 3 and 4, the A/V recording and communication device 210 may include a communication module 312. Thus, in one embodiment, the motion detection protocol may include generating a motion alert, and transmitting the motion alert via the communication module 312 to a computing device (e.g., to at least one of the client devices 214, 216). In another embodiment, the motion detection protocol may include transmitting video data from the camera 314 associated with the detected motion to a computing device (e.g., to at least one of the client devices 214, 216). Again, this transmission of video data may, but is not required to, occur via the communication module 312.

In one embodiment, the communication module 312 may be configured to communicate with the backend server 224 (FIG. 2), and may be configured to receive from the backend server 224 an instruction to transition between a first state associated with the first time window and a second state associated with the second time window. In an alternate embodiment, the communication module 312 may be configured to communicate with the hub device 202, and the communication module 312 may receive an instruction from the hub device 202 to transition between the first state associated with the first time window and the second state associated with the second time window.

In some embodiments, the first time window may be configured to begin at about sunrise, while the second time window may be configured to begin at about sunset. In the case where the A/V recording and communication device 210 includes a communication module 312, the communication module 312 may be configured to connect to the Internet, and to download sunrise and sunset data for one or more days. In this way, it is possible for the user to simply rely on sunrise and sunset as the beginning times for the first and second time windows, respectively, and the A/V recording and communication device 210 may continually update those sunrise and sunset times as they change over the course of the year.

In some embodiments, the A/V recording and communication device 210 may further include a light sensor 318 (FIG. 3), which is configured to detect a light intensity level from the FOV of camera 314. In that scenario, the computer program may further include instructions for determining when the time of day is approaching sunrise and sunset based upon the amount of light intensity detected by the light sensor 318. These embodiments thus provide yet another way that the user can rely on sunrise and sunset as the beginning times for two time windows, without actively changing the beginning times for those windows.

As noted above with reference to FIG. 1B, a user may have two or more different A/V recording and communication devices 210', 210", where the first FOV associated with the camera 314' of the first A/V device 210' may overlap with the second FOV associated with the camera 314" of the second A/V device 210". In that scenario, each such device 210' and 210" may have its own communication module 312' and 312", respectively, to enable communication between the two devices. Further, the motion detection protocol in that scenario may include the first A/V recording and communication device 210' issuing an instruction to the second A/V recording and communication device 210" to begin recording audio and/or video, and/or vice versa.

In another embodiment, the A/V recording and communication device 210 may include one or more light sources, including, e.g., the light emitting components 340, the light controller 302, and the lights 304(a), 304(b) (FIG. 3). The light sources may be capable of illuminating at least a portion of the first zone and the second zone. In a different embodiment, the computer program may include additional instructions for receiving an input that indicates a set of boundaries defining the first zone and the second zone. The computer program may likewise include instructions for receiving inputs indicating a set of times defining the respective beginnings for the first time window and the second time window.

Figure 9:
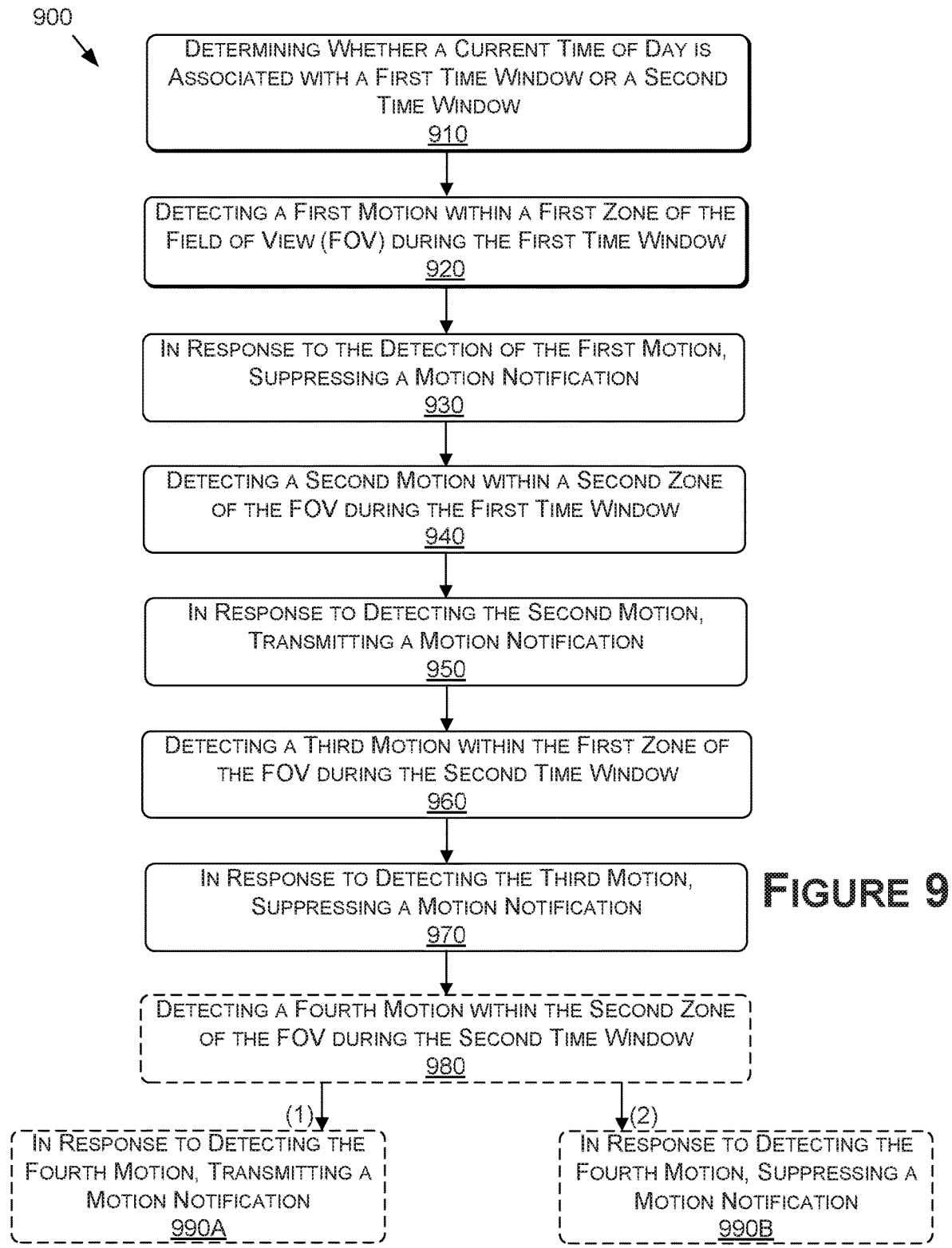
FIG. 9 is a flowchart illustrating an example process for executing and suppressing motion notifications based upon the detection of first and second motions in first and second motion zones during different time windows, according to various aspects of the present disclosure.

FIG. 9 is a flowchart illustrating an example process 900 for transmitting and suppressing motion notifications based upon the detection of first and second motions in first and second zones, during different time windows. The process 900 may be stored in a non-transitory machine-readable memory, such as the non-volatile memory 324, and may comprise a computer program executable by at least one processor, including the processor(s) 310. Certain portions of the process 900 may be intended for a different example scenario in which the user of the security system wishes to generally track and/or be notified about motion detected on her property, with the exception of two specific time windows in which she knows that regularly-scheduled incidents may occur. For example, the user may know that the garbage always gets picked up from her driveway 125 between 7:00 AM and 9:00 AM on a given day, and that the mail always gets dropped off between 10:00 AM and 11:00 AM every day (except, perhaps, on Sundays). Accordingly, the user may define a first time window for that day as beginning at 7:00 AM, a second time window as beginning at 9:00 AM, and a third time window as beginning at 10:00 AM. In this way, the user can suppress motion notifications during the garbage pickup window and the mail drop-off window.

In another example process corresponding to the example scenario described immediately above, the transitions from the first time window to the second time window, and vice versa, may be controlled by reference to a clock. For example, the process 900 begins at block 910, in which the A/V recording and communication device 210 determines whether a current time of day is associated with a first time window or a second time window. This aspect may reference an onboard clock of the A/V recording and communication device 210 (not shown in FIG. 3 or 4), and/or via an external clock that is associated with the hub 202 and/or the backend server 224. If the clock is onboard, the A/V recording and communication device 210 may compare the time of the onboard clock, reflecting the current time of day, to the specified beginnings and/or endings of the first and second time windows, to determine which time window corresponds to the current time of day. Alternatively, if the clock is external to the A/V recording and communication device 210, such as in the hub 202 or the backend server 224, the determination of whether a current time of day is associated with the first time window or the second time window may occur at the hub 202 or the backend server 224, and a control signal may then be sent from the hub 202 or the backend server 224 and received by the A/V recording and communication device 210, where the control signal causes the A/V recording and communication device 210 to transition from a first operational state corresponding to the first time window to a second operational state corresponding to the second time window, or vice versa.

At block 920, the A/V recording and communication device 210 the A/V recording and communication device 210 detects a first motion within a first zone of the FOV of the camera 314 associated with the A/V recording and communication device 210, during the first time window. Again, that detection of motion may be performed by the camera 314, or by any of the sensors that are components of the A/V recording and communication device 210, including the motion sensor(s) 326. Further, as in response to detecting the first motion, the A/V recording and communication device 210 may determine whether the first motion took place within any of the motion zones that the user has programmed into the system. If the motion is determined to have taken place within a motion zone, the A/V recording and communication device 210 may also determine whether that specific motion zone is in a first state, in which it is programmed to transmit a motion notification, or in a second state, in which it is programmed to suppress a motion notification.

At block 930, in response to detecting the first motion, the A/V recording and communication device 210 suppresses a motion notification. In the example explained above, the A/V recording and communication device 210 may suppress the motion notification because the first motion was detected within the first motion zone (e.g., the driveway 125) during the first time window (e.g., during the garbage pickup window), and because the user of the security system does not wish to track, or be notified about, motion caused by the garbage pickup.

At block 940, the A/V recording and communication device 210 detects a second motion within a second zone of the FOV of the camera 314, also during the first time window. In the example explained above, the A/V recording and communication device 210 may transmit the motion notification because the second motion was detected within the second motion zone (e.g., the lawn 135) during the first time window (e.g., during the garbage pickup window), and because the user of the security system wishes to track and/or be notified about motion detected outside of the driveway 125, even if it happens during the garbage pickup. Thus, at block 950, in response to the detection of the second motion, the A/V recording and communication device 210 transmits a motion notification to a computing device, such as at least one of the client devices 214, 216.

At block 960, the A/V recording and communication device 210 detects a third motion within the first zone of the FOV, this time during a second time window. In this case, the second time window may correspond to the mail drop-off time window explained above. Thus, in response to detecting the third motion, at block 970, the A/V recording and communication device 210 suppresses a motion notification. In the example explained above, the A/V recording and communication device 210 may suppress the motion notification because the third motion was detected within the first motion zone (e.g., the driveway 125) during the second time window (e.g., during the mail drop-off window), and because the user of the security system does not wish to track, or be notified about, motion caused by the mailperson.

The process 900 may continue with the A/V recording and communication device 210 detecting, at block 980, a fourth motion within the second zone of the FOV during the second time window. In response to the fourth motion, the process 900 may alternatively move to block 990A or block 990B, depending upon the configuration for the second zone of the FOV during the second time window (e.g., whether the motion detection protocol is active or inactive for the second zone of the FOV during the second time window). At block 990A, the A/V recording and communication device 210 transmits a motion notification, whereas at block 990B, the A/V recording and communication device 210 suppresses the motion notification. As set forth above, transmitting a motion notification may include generating the motion notification, and transmitting the motion notification via the communication module 312 to a computing device, such as at least one of the client devices 214, 216. Alternatively, transmitting the motion notification may include transmitting video data reflecting the motion detected from the camera 314 to a computing device, such as at least one of the client devices 214, 216.

In another embodiment, the A/V recording and communication device 210 may be configured such that it always records and streams video to the hub 202 and/or to the backend server 224, or such that it always begins to record and stream video to the hub 202 and/or to the backend server 224 in response to detecting motion in any of the motion zones. In that scenario, the hub 202 and/or the backend server 224 may determine whether to execute or suppress a motion detection protocol, and/or whether to send or suppress an alert to the user, depending upon the time of day, and in which zone the motion was detected (e.g., depending upon whether the motion detection protocol and/or the user alert protocol is active or inactive at that time of day for the zone in which the motion was detected).

Figure 10:
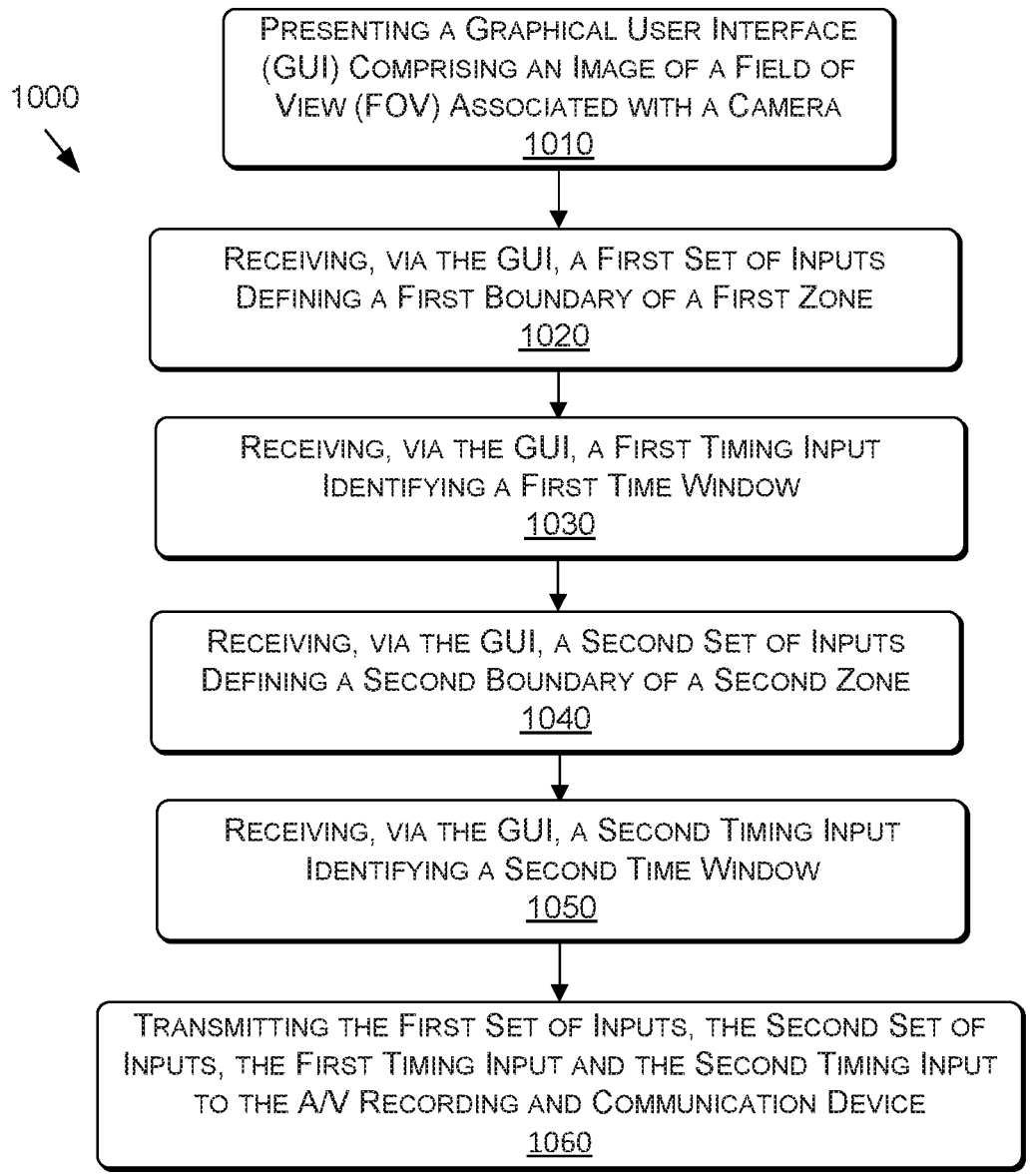
FIG. 10 is a flowchart illustrating an example process for defining temporal motion zones for the selective transmission and suppression of motion notifications by an A/V recording and communication device, according to various aspects of the present disclosure.

FIG. 10 is a flowchart illustrating an example process 1000 for defining temporal motion zones for the selective transmission and suppression of motion notifications, or for the selective execution or suppression of a motion detection protocol, by an A/V recording and communication device 210. The process 1000 may be carried out, for example, on a client device 214, 216. The process 1000 begins at block 1010, where a graphical user interface 100 is presented on the display 618 (FIG. 6) of the client device 214, 216, and the graphical user interface 100 includes an image of a FOV 110 associated with the camera 314 of an A/V recording and communication device 210. The process 1000 then proceeds to block 1020, where the client device 214, 216 may receive, via the graphical user interface 100 (and potentially via the input interface 604), a first set of inputs that define a first boundary of a first zone. At block 1030, the client device 214, 216 may receive, via the graphical user interface 100 (and potentially via the input interface 604), a second set of inputs that define a second boundary of a second zone. At block 1040, the client device 214, 216 may receive, via the graphical user interface 100 (and potentially via the input interface 604), a first timing input identifying a first time window. At block 1050, the client device 214, 216 may receive, via the graphical user interface 100 (and potentially via the input interface 604), a second timing input identifying a second time window, which is different from the first time window. In various embodiments, the first and second timing inputs may correspond to both of the first and second zones. Alternatively, the first and second timing inputs may correspond to only the first zone, and the process 1000 may further include receiving, via the graphical user interface 100 (and potentially via the input interface 604), a third timing input identifying a third time window, and a fourth timing input identifying a fourth time window, which is different from the third time window, and where the third and fourth timing inputs correspond to only the second zone. Finally, the process 1000 ends at block 1060, where the client device 214, 216, for example, via its communication module 610, transmits the first set of inputs, the second set of inputs, the first timing input, and the second timing input to the A/V recording and communication device 210.

The first and second timing inputs may correspond to a specific time of day, such as 8:00 AM and 8:00 PM, respectively. Alternatively, those two inputs may include a signifier that the system can use to identify a specific time of day, such as sunrise and sunset. In the latter case, as described above, the system may be able to identify the time of sunrise and sunset by downloading sunrise and sunset times from the Internet, or by using a light sensor to detect when the ambient light level suggests sunrise and sunset are approaching. In one embodiment, the physical boundaries of the first zone may overlap with the physical boundaries of the second zone. In an alternative embodiment, the boundaries of the first and second zones do not overlap.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A security camera device comprising:
  a camera having a field of view (FOV);
  one or more processors; and
  one or more computer-readable media storing instructions that, when executed by the one or more processors, cause the security camera device to perform operations comprising:
    receiving first image data generated by the camera;
    detecting, based at least in part on the first image data, first motion associated with a first portion of the FOV, the first portion of the FOV being less than an entirety of the FOV;
    determining an object type for an object detected within a first portion of the first image data, the first portion of the first image data corresponding to the first portion of the FOV, and the object type indicating that the object is a person;
    determining a time window associated with the first portion of the FOV of the camera;
    determining that a first time associated with the first image data is within the time window associated with the first portion of the FOV of the camera;
    based at least in part on the object type being a person object type, the detecting the first motion associated with the first portion of the FOV, and the determining that the first time is within the time window, sending a first indication associated with the first motion to one or more computing devices.

2. The security camera device of claim 1, the one or more computer-readable media storing further instructions that, when executed by the one or more processors, cause the security camera device to perform further operations comprising receiving, from the one or more computing devices, zone data representing at least:
  the first portion of the FOV of the camera; and
  the time window.

3. The security camera device of claim 1, wherein:
  the detecting the first motion associated with the first portion of the FOV comprises determining that a portion of the first image data represents a first object, the portion of the first image data corresponding to the first portion of the FOV; and
  the detecting the second motion associated with the first portion of the FOV comprises determining that a portion of the second image data represents a second object, the portion of the second image data corresponding to the first portion of the FOV.

4. The security camera device of claim 1, wherein:
  the detecting the first motion associated with the first portion of the FOV comprises determining that a portion of the first image data represents the first motion, the portion of the first image data corresponding to the first portion of the FOV; and
  the detecting the second motion associated with the first portion of the FOV comprises determining that a portion of the second image data represents the second motion, the portion of the second image data corresponding to the first portion of the FOV.

5. The security camera device of claim 1, the one or more computer-readable media storing further instructions that, when executed by the one or more processors, cause the security camera device to perform further operations comprising:
  storing motion zone data indicating at least:
    the first portion of the FOV; and
    the time window,
  wherein the sending of the first indication is further based at least in part on the motion zone data.

6. The security camera device of claim 1, wherein the time window includes at least a first time indicating a start of the time window and a second time indicating an end of the time window.

7. The security camera device of claim 1, the one or more computer-readable media storing further instructions that, when executed by the one or more processors, cause the security camera device to perform further operations comprising:
  receiving, at a third time, third image data generated by the camera;
  detecting, based at least in part on the third image data, third motion associated with a second portion of the FOV; and
  based at least in part on the detecting the third motion associated with the second portion of the FOV, refraining from sending a third indication associated with the third motion to the one or more computing devices.

8. The security camera device of claim 1, the one or more computer-readable media storing further instructions that, when executed by the one or more processors, cause the security camera device to perform further operations comprising:
  sending the first image data to the one or more computing devices; and
  sending the second image data to the one or more computing devices.

9. The security camera device of claim 1, the one or more computer-readable media storing further instructions that, when executed by the one or more processors, cause the security camera device to perform further operations comprising:
  sending the first image data to the one or more computing devices; and refraining from sending the second image data to the one or more computing devices.

10. The security camera device of claim 1, wherein the object type for the object is determined by comparing information about the object to information stored in an object database in relation to a number of object types.

11. One or more computing devices comprising:
one or more processors; and
one or more computer-readable media storing instructions that, when executed by the one or more processors, cause the one or more computing devices to perform operations comprising:
receiving, from a security camera device, first data indicating that the security camera device detected first motion associated with a first portion of a field of view (FOV) of the security camera device, the first portion of the FOV being less than an entirety of the FOV of the security camera device;
determining a time window associated with the first portion of the field of view of the security camera device;
determining that a first time at which the first motion was detected is within the time window associated with the first portion of the field of view of the security camera device; and
based at least in part on the first motion being within the first portion of the FOV, and the first time being within the time window, sending, to a second security camera device, a message representing an instruction to activate.

12. The one or more computing devices of claim 11, the one or more computer-readable media storing further instructions that, when executed by the one or more processors, cause the one or more computing devices to perform further operations comprising:
storing third data indicating at least:
the first portion of the FOV; and
the time window, wherein the sending of the first indication is further based at least in part on the zone data.

13. The one or more computing devices of claim 11, the one or more computer-readable media storing further instructions that, when executed by the one or more processors, cause the one or more computing devices to perform further operations comprising receiving, from the user device, third data indicating at least:
the first portion of the FOV; and
the time window.

14. The one or more computing devices of claim 11, the one or more computer-readable media storing further instructions that, when executed by the one or more processors, cause the one or more computing devices to perform further operations comprising:
receiving first image data associated with the first motion;
storing the first image data in one or more databases;
receiving second image data associated with the second motion; and
storing the second image data in the one or more databases.

15. The one or more computing devices of claim 11, the one or more computer-readable media storing further instructions that, when executed by the one or more processors, cause the one or more computing devices to perform further operations comprising:
receiving third data indicating that the security camera device detected third motion associated with a second portion of the FOV; and
based at least in part on the third motion being within the second portion of the FOV, refraining from sending, to the user device, a third notification associated with the third motion.

16. The one or more computing devices of claim 11, wherein the first data is first image data and the second data is second image data, and wherein the one or more computer-readable media store further instructions that, when executed by the one or more processors, cause the one or more computing devices to perform further operations comprising:
detecting, based at least in part on the first image data, the first motion associated with the first portion of the FOV; and
detecting, based at least in part on the second image data, the second motion associated with the first portion of the FOV.

17. The one or more computing devices of claim 16, wherein:
the detecting the first motion associated with the first portion of the FOV comprises determining that a portion of the first image data represents a first object, the portion of the first image data corresponding to the first portion of the FOV; and
the detecting the second motion associated with the first portion of the FOV comprises determining that a portion of the second image data represents a second object, the portion of the second image data corresponding to the first portion of the FOV.

18. The one or more computing devices of claim 11, wherein the one or more computer-readable media store further instructions that, when executed by the one or more processors, cause the one or more computing devices to perform operations comprising determining a time window associated with the first portion of the field of view of the camera device.

19. The one or more computing devices of claim 11, wherein the first message represents an instruction to activate a camera of a second security camera device.

20. The one or more computing devices of claim 11, wherein the first message represents an instruction to activate a motion sensor of a second security camera device.

21. A security camera device comprising:
a first motion sensor;
one or more processors; and
one or more computer-readable media storing instructions that, when executed by the one or more processors, cause the security camera device to perform operations comprising:
receiving, at a first time, first sensor data generated by the first motion sensor, wherein the first motion sensor is associated with a first portion of a field of view (FOV) of the security camera device that is less than an entirety of the FOV of the security camera device;
determining, based at least in part on the first sensor data, that the first motion sensor detected first motion;
determining that the first time is within a time window; and
based at least in part on the determining that the first motion sensor detected the first motion, and the determining that the first time is within the time window, sending a first message to one or more computing devices.

22. The security camera device of claim 21, the one or more computer-readable media storing further instructions that, when executed by the one or more processors, cause the security camera device to perform further operations comprising:

receiving, at a second time, second sensor data generated by a second motion sensor, the second time being within the time window;

determining, based at least in part on the second sensor data, that the second motion sensor detected second motion; and based at least in part on the determining that the second motion sensor detected the second motion, refraining from sending a notification associated with the second motion to the one or more computing devices.

23. The security camera device of claim 21, the one or more computer-readable media storing further instructions that, when executed by the one or more processors, cause the security camera device to perform further operations comprising:

storing motion zone data indicating at least:

the first motion sensor; and the time window, wherein the sending of the first message is further based at least in part on the motion zone data.

24. The security camera device of claim 21, further comprising a camera, and wherein the one or more computer-readable media storing further instructions that, when executed by the one or more processors, cause the security camera device to perform further operations comprising:

based at least in part on the determining that the first motion sensor detected the first motion and the determining that the first time is within the time window: at least one of:

generating first image data using the camera; or sending the first image data to the one or more computing devices.

25. A method comprising:

receiving, by a system from a remote first security camera device, first data indicating that the first security camera device detected first motion associated with a first portion of a field of view (FOV) of the first security camera device that is less than an entirety of the FOV of the first security camera device;

determining, by the system, a time window associated with the first portion of the field of view of the first security camera device;

determining, by the system, that a first time at which the first motion was detected is within the time window associated with the first portion of the field of view of the first security camera device; and based at least in part on the first motion being within the first portion of the FOV, and the first time being within the time window, sending, to a remote second security camera device, a message representing an instruction to activate.

26. The method of claim 25, wherein the message representing the instruction to activate represents an instruction to activate a camera of the second security camera device.

27. The method of claim 25, wherein the message representing the instruction to activate represents an instruction to activate a motion sensor of the second security camera device.

28. The method of claim 25, wherein the first security camera device comprises a video doorbell device.

* * * * *